(12) United States Patent
Matuszewski et al.

(10) Patent No.: US 7,796,990 B2
(45) Date of Patent: Sep. 14, 2010

(54) METHOD FOR THE ROUTING OF MULTIMEDIA COMMUNICATION RELATED SIGNALING IN A COMMUNICATION SYSTEM

(75) Inventors: Marcin Wieslaw Matuszewski, Espoo (FI); Miguel-Angel Garcia-Martin, Helsinki (FI)

(73) Assignee: Nokia Corporation, Espoo (FI)

( * ) Notice: Subject to any disclaimer, the term of this patent is extended or adjusted under 35 U.S.C. 154(b) by 521 days.

(21) Appl. No.: 11/520,655

(22) Filed: Sep. 14, 2006

(65) Prior Publication Data
US 2008/0070543 A1    Mar. 20, 2008

(51) Int. Cl.
*H04W 4/00* (2009.01)
(52) U.S. Cl. .................. 455/435.1; 455/410; 455/411; 370/395.21; 370/395.52; 370/401; 370/402; 370/403; 380/255; 713/153; 726/2; 726/27; 726/28
(58) Field of Classification Search .................. 380/282, 380/255; 370/310, 395.21, 395.51, 395.52, 370/401–404; 709/228, 217–219, 237–239; 455/410, 411, 435.1–435.3; 713/153, 168, 713/171; 726/2–7, 27, 28
See application file for complete search history.

(56) References Cited

U.S. PATENT DOCUMENTS

2003/0202663 A1* 10/2003 Hollis et al. ................ 380/282
2004/0064568 A1*  4/2004 Arora et al. ................ 709/228
2004/0196796 A1* 10/2004 Bajko et al. ................ 370/310
2004/0215622 A1* 10/2004 Dubnicki et al. ............ 707/10
2005/0114862 A1*  5/2005 Bisdikian et al. ........... 718/105

FOREIGN PATENT DOCUMENTS

WO   WO 2004/054302 A1   6/2004
WO   WO 2004/089022 A1   10/2004

OTHER PUBLICATIONS

Henry Sinnreich (PULVER.COM), "The Challenge of P2P Internet Communications", Apr. 12, 2006, pp. 1-12.
International Search Report PCT/FI2007/050482 filed Sep. 11, 2007.

* cited by examiner

*Primary Examiner*—Nick Corsaro
*Assistant Examiner*—Chuong A Ngo
(74) *Attorney, Agent, or Firm*—Alston & Bird LLP

(57) ABSTRACT

The invention relates to a method for the routing of multimedia communication related signaling in a communication system. In the method a signaling message is received to a first network node. The signaling message provides an identity associated with a user. A hash key is computed from the identity. The hash key is matched to a number of key ranges, each key range being associated with a network node. A second network node is determined by detecting that said hash key belongs to the key range of the second network node. A signaling message is provided to the second network node. Subscriber data associated with the identity is obtained in from the second network node. The signaling message is processed in the second network node based on information in the subscriber data.

16 Claims, 10 Drawing Sheets

Signaling plane
User plane

Signaling plane
User plane

METHOD FOR THE ROUTING OF MULTIMEDIA COMMUNICATION RELATED SIGNALING IN A COMMUNICATION SYSTEM

BACKGROUND OF THE INVENTION

1. Field of the Invention

The invention relates to the routing of communication signaling in packet switched communication systems. Particularly, the invention relates to a method for the routing of multimedia communication related signaling in a communication system.

2. Description of the Related Art

The transport of voice and multimedia over packet switched networks, that is, the Voice over Internet Protocol (VoIP) architecture has in the recent years emerged as a viable alternative for traditional circuit switched networks. In VoIP there are separate call processing servers that control IP routers to provide for voice or video paths. A single call processing server may control a multitude of routers of varying types and capacities. The prevalent standard for establishing Internet Protocol (IP) multimedia sessions is the Internet Engineering Task Force (IETF) Session Initiation Protocol (SIP). The transport of media components, that is, media streams is performed using a Real-Time Protocol (RTP) over User Datagram Protocol (UDP). The IP multimedia architecture for UMTS and GPRS mobile communication networks is referred to as an IP Multimedia Subsystem (IMS).

Reference is now made to FIG. 1, which illustrates a user subscription in prior art. In FIG. 1 there is a subscription 100 for a given user. Subscription data 100 comprises information such as billing address and banking data. Subscription data 100 comprises two user private identities, namely private identity 110 and private identity 120. A subscription may have associated with it multiple private identities. A private identity is used to authenticate the user. In cellular networks, a unique private user identity can be stored in a non-volatile removable memory, such as a smart card, which is inserted in a given user equipment, in other words, a mobile station or a fixed terminal that the user may operate. Associated with a private identity there may be multiple public identities. A public identity represents, for example, a SIP Uniform Resource Identifier (SIP-URI) or a Tel-URI via which the user may be reached. Terminating sessions may be subjected to different treatment depending on the public identity used for reaching the user. The same is true also on originating sessions. The private identities and the public identities may have a Uniform Resource Locator (URL) format. In FIG. 1 private identity 110 has associated with it a public identity 111 and a public identity 112, whereas private identity 120 has associated with a public identity 123 and public identity 124. Each public identity is associated with a service profile. A service profile defines a number of services for a given public identity. The services may affect session reception and routing depending on service parameters and session properties. The services are triggered using filter criteria in the service profile. Public identity 111 is associated with service profile 131. Public identities 112, 123 and 124 are associated with service profile 132. A number of public identities may belong to an Implicitly Registered Set (IRS). Whenever a user has a set of public identities defined to be implicitly registered via a single registration of one of the public identities in that set, it is considered to be an Implicit Registration. No single public identity is considered as a master to the other public identities. In FIG. 1 public identity 111 belongs to IRS 141, whereas public identities 112, 123 and 124 belong to IRS 142.

The problems associated with the prior art architectures may be related to the lack of robustness and scalability. In a mobile network a home subscriber server or a location register may represent a single point of failure. Further, whenever a new call processing server is added to the network there is a need to reconfigure the network.

SUMMARY OF THE INVENTION

The invention relates to a method for the routing of multimedia communication related signaling in a communication system comprising at least a first network node and a second network node. The method comprises: receiving a signaling message to a first network node, said signaling message providing at least one identity; computing a key from a first identity among said at least one identity; matching said key to at least one key range, each said at least one key range being associated with a network node; determining a second network node by detecting that said key belongs to the key range of said second network node; providing said signaling message to said second network node; obtaining data associated with said identity in said second network node; and processing said signaling message in said second network node based on said obtained data.

The invention relates also to a method comprising: allocating a subscriber identity, at least one private user identity and at least one public user identity; computing a first key from said subscriber identity; computing at least one second key from said at least one private user identity; computing at least one third key from said at least one public user identity; obtaining service subscription information associated with said subscriber identity in a management node; associating said subscription information with each said at least one private user identity to produce first data in said management node; associating each said at least one public user identity with a private user identity among said at least one private user identity to produce second data in said management node; associating initial data with said at least one public user identity to produce at least one third data in a management node; delivering said first data from said management node to a first network element using said first key; delivering said at least one second data from said management node to at least one second network element using said at least one second key; and delivering said at least one third data from said management node to at least one third network element using said at least one third key.

The invention relates also to a communication system comprising: a first network node configured to receive a signaling message, said signaling message providing at least one identity, to compute a key from a first identity among said at least one identity, to match said key to at least one key range, each said at least one key range being associated with a network node, to determine a second network node by detecting that said key belongs to the key range of said second network node and to provide said signaling message to said second network node; said second network node configured to obtain data associated with said identity and to process said signaling message based on said obtained data.

The invention relates also to a communication system comprising: a management network node configured to allocate a subscriber identity, at least one private user identity and at least one public user identity, to compute a first key from said subscriber identity, to compute at least one second key from said at least one private user identity, to compute at least one third key from said at least one public user identity, to obtain service subscription information associated with said subscriber identity, to associate said subscription information with each said at least one private user identity to produce first data, to associate each said at least one public user identity with a private user identity among said at least one private user identity to produce second data, to associate initial data with said at least one public user identity to produce at least one third data, to deliver said first data to a first network element using said first key, to deliver said at least one second data to at least one second network element using said at least one second key and to deliver said at least one third data to at least one third network element using said at least one third key.

The invention relates also to a network node comprising: an application entity configured to receive a signaling message, said signaling message providing at least one identity, to compute a key from a first identity among said at least one identity and to provide said signaling message to a remote network node; and a data storage entity configured to match said key to at least one key range, each said at least one key range being associated with a network node, to determine said remote network node, wherein said remote network node is in charge of session handling for the user associated with said first identity, by detecting that said key belongs to the key range of said remote network node.

The invention relates also to a network node comprising: means for receiving a signaling message, said signaling message providing at least one identity; means for computing a key from a first identity among said at least one identity; means for matching said key to at least one key range, each said at least one key range being associated with a network node; means for determining said remote network node, wherein said remote network node is in charge of session handling for the user associated with said first identity, by detecting that said key belongs to the key range of said remote network node; and means for providing said signaling message to said remote network node.

The invention relates also to a network node comprising: a management entity configured to allocate a subscriber identity, at least one private user identity and at least one public user identity, to compute a first key from said subscriber identity, to compute at least one second key from said at least one private user identity, to compute at least one third key from said at least one public user identity, to obtain service subscription information associated with said subscriber identity, to associate said subscription information with each said at least one private user identity to produce first data, to associate each said at least one public user identity with a private user identity among said at least one private user identity to produce second data, to associate initial data with said at least one public user identity to produce at least one third data, to deliver said first data to a first network element using said first hash key, to deliver said at least one second data to at least one second network element using said at least one second hash key and to deliver said at least one third data to at least one third network element using said at least one third key.

The invention relates also to a network node comprising: means for allocating a subscriber identity, at least one private user identity, and at least one public user identity; means for obtaining a first key computable from said subscriber identity using a predefined hash function; means for obtaining a second hash key computable from said at least private user identity using a predefined hash function; means for obtaining at least one third hash key computable from said at least one public user identity using a predefined hash function; means for associating said at least one private user identity with said subscriber identity to produce first data; means for associating said at least one public user identity with said at least one private user identity to produce second data; means for associating initial routing information and registration status with said at least one public user identity to produce at least one third data; means for delivering said first data towards a first network element using said first hash key; means for delivering said at least one second data towards at least one second network element using said at least one second hash key; and means for delivering said at least one third data towards at least one third network element using said at least one third hash key.

The invention relates also to a computer program embodied on a computer readable medium, when executed on a data-processing system, the computer program being configured to perform: receiving a signaling message, said signaling message providing at least one identity; computing a key from a first identity among said at least one identity; matching said key to at least one key range, each said at least one key range being associated with a network node; determining a network node in charge of session handling for the user associated with said first identity by detecting that said key belongs to the key range of said network node; and providing said signaling message to said network node.

The invention relates also to a computer program embodied on a computer readable medium, when executed on a data-processing system, the computer program being configured to perform: allocating a subscriber identity, at least one private user identity and at least one public user identity; computing a first key from said subscriber identity; computing at least one second key from said at least one private user identity; computing at least one third key from said at least one public user identity; obtaining service subscription information associated with said subscriber identity; associating said subscription information with each said at least one private user identity to produce first data; associating each said at least one public user identity with a private user identity among said at least one private user identity to produce second data; associating initial data with said at least one public user identity to produce at least one third data; delivering said first data to a first network element using said first hash key; delivering said at least one second data to at least one second network element using said at least one second hash key; and delivering said at least one third data to at least one third network element using said at least one third key.

In certain embodiments of the invention, the computing of a key comprises computing a hash function.

In one embodiment of the invention, the application entity in the second network node is configured to determine via the data storage entity at least one public user identity associated with said first identity. The application entity is configured to determine routing identifiers for each said at least one public user identity and to submit said signaling message for routing in the communication system to at least one third network node identified with said routing identifiers. The routing is performed using a distributed hash table and computing hash keys for the public user identities or using an address lookup based on network node names associated with the public user identities in the second network node. Thus, a routing identifier may be a hash key computed from a public user identity or it may be an IP address or a fully qualified domain name. The communication system comprises said at least one third network node. Third network nodes may also comprise the first and the second network nodes. A third network node stores public user identity data associated with a public user identity such as user profiles, registration status, contact address of the user and presence status. The registration status is updated upon receiving a signaling message signifying network attach for the terminal of the user associated with the public user identity. Presence status is updated upon receiving a signaling message signifying presence status update for the user associated with the public user identity. The presence status and other presence information recorded associated with the public user identity may be subscribed to by watchers, that is, users interested in that information. In response to subscriptions the watcher is provided with an immediate notification or a series of notifications that are issued whenever there is a change in the presence status and the other presence information.

In one embodiment of the invention, there is a data storage entity in the second network node which is configured to determine a fourth network node having a key range closest to said hash key. An application entity in the second network element is configured to send said signaling message to said fourth network node.

In one embodiment of the invention, the communication system comprises an access network and a proxy network node with an application entity configured to receive said signaling message from an end device, that is, a terminal via said access network and to transmit said signaling message to said first network node. The application entity may comprise Session Initiation Protocol (SIP) functionality. The proxy network node may be, for example, a Proxy Call/Session State Control Function (CSCF), that is, a P-CSCF.

In one embodiment of the invention, a data storage entity in the third network node is configured to register a user associated with said identity as active in said public user identity data associated with said identity, to register an identity of said proxy network node and to register an identity of the end device used by the user in said public user identity data associated with said identity. The storing of these data is performed to the data storage entity which comprises part of a distributed hash table. The distributed hash table is maintained in the first, second and third network nodes together with other possible network nodes with combined signaling and distributed hash table functionality.

In one embodiment of the invention, the application entity in the second network node is configured to receive a session initiation message. The application entity is configured to determine the registration status of said identity via the storage entity. The application entity is configured to determine said identity of said proxy network node and to send said session initiation message to said proxy network node.

In one embodiment of the invention, the application entity in the second network node is configured to receive a session initiation message, to determine the registration status of said identity, to determine said identity of said end device of the user and to send said session initiation message to said end device of the user.

In one embodiment of the invention, the signaling message comprises a Session Initiation Protocol (SIP) message, for example, the INVITE message or the REGISTER message.

In one embodiment of the invention, the application entity in the second network node is configured to forward said signaling message to a fifth network node using a distributed hash table maintained in part by the data storage entity. A data storage entity in the fifth network node is configured to find a set of secondary identities to be implicitly registered together with said identity. The application entity is configured to compute secondary keys for each said secondary identity. The application entity is configured to forward using said distributed hash table signaling messages to each network node responsible for said secondary keys. The forwarding using the distributed hash table comprises finding using the data storage entity the network node closest to a given secondary hash key in terms of key ranges and the sending of the signaling message to that network node using the application entity.

In one embodiment of the invention, the communication system comprises an IP multimedia subsystem. The first, second, third, fourth and fifth network nodes may be IP Multimedia Subsystem (IMS) nodes.

In one embodiment of the invention, the first, second, third, fourth and fifth network nodes may be call processing servers.

In one embodiment of the invention, said communication system comprises a mobile communication network. In one embodiment of the invention, said terminal, in other words, end device comprises a mobile station or generally a mobile terminal. In one embodiment of the invention a user of a mobile terminal is identified using a subscriber module, for example, User Services Identity Module (UMTS) or a Subscriber Identity Module (SIM). The combination of Mobile Equipment (ME) and a subscriber module may be referred to as a mobile subscriber.

In one embodiment of the invention, the communication system comprises at least one of a Global System of Mobile Communications (GSM) network and a Universal Mobile Telephone System (UMTS) network. The mobile station may be, for example, a GSM mobile station or a UMTS mobile station with a dual mode or multimode functionality to support different access types.

In one embodiment of the invention, the computer program is stored on a computer readable medium. The computer readable medium may be a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, a data storage entity in a third network node among said at least one third network node is configured to register a user associated with a first public user identity among said at least one public user identity as active in said first public user identity data associated with said first public user identity, to register an identity of said proxy network node and to register an identity of the end device used by the user in said first public user identity data associated with said first public user identity. The storing of these data is performed to the data storage entity which comprises part of a distributed hash table. The distributed hash table is maintained in the first, second and third network nodes together with other network nodes with combined signaling and distributed hash table functionality.

In one embodiment of the invention, the application entity in the third network node is configured to receive a session initiation message. The application entity is configured to determine the registration status of said first public user identity via the storage entity. The application entity is configured to determine said identity of said proxy network node and to send said session initiation message to said proxy network node.

In one embodiment of the invention, the application entity in the third network node is configured to receive a session initiation message, to determine the registration status of said first public user identity, to determine said identity of said end device of the user and to send said session initiation message to said end device of the user.

The embodiments of the invention described hereinbefore may be used in any combination with each other. Several of the embodiments may be combined together to form a further embodiment of the invention. A method, a communication system, a network node or a computer program to which the invention is related may comprise at least one of the embodiments of the invention described hereinbefore.

The benefits of the invention are related to, for example, increased scalability. Ease of maintenance may also achieved by avoiding complex centralized system entities. Due to the fact that the distributed hash tables are able to react automatically to changes, for example, when a node comes up or fails, no operator intervention may be required.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
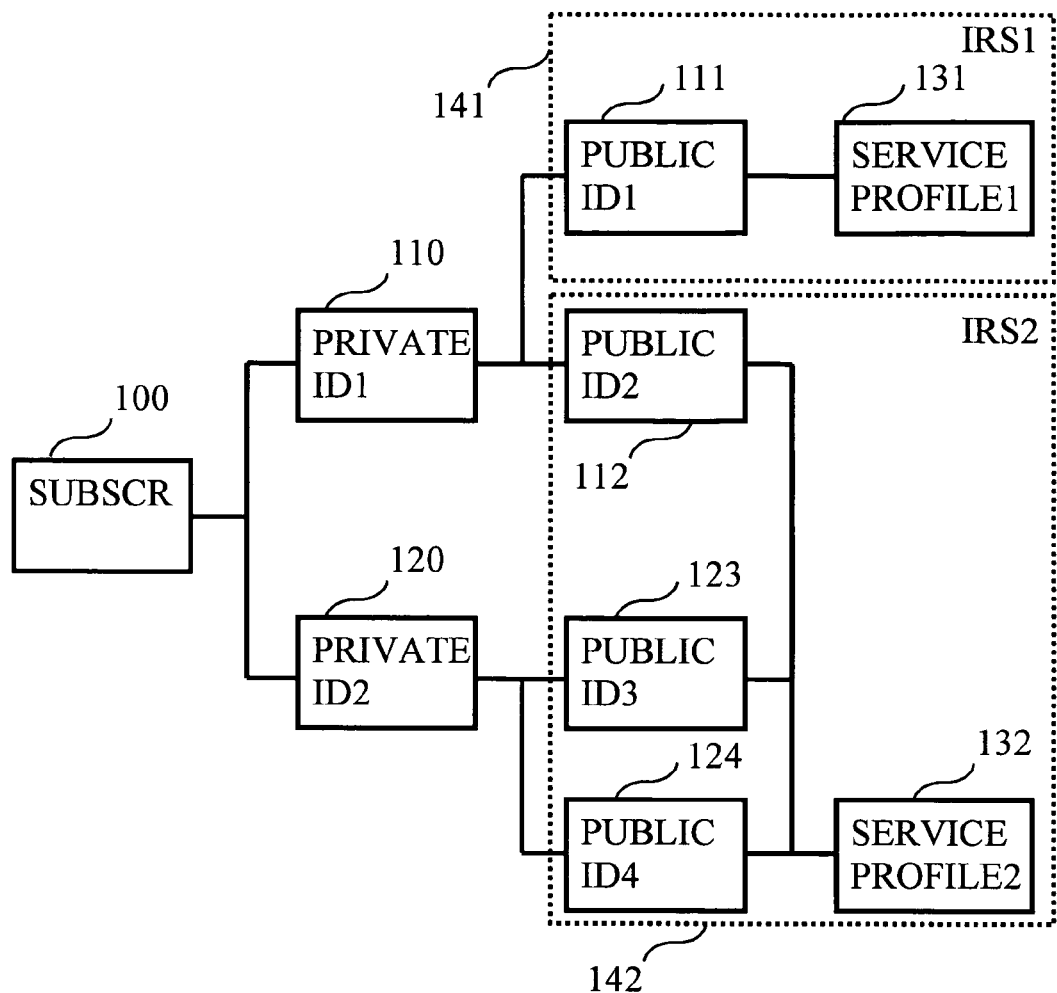
FIG. 1 is a block diagram illustrating an IP Multimedia Subscription (IMS) in prior art.
Figure 2A:
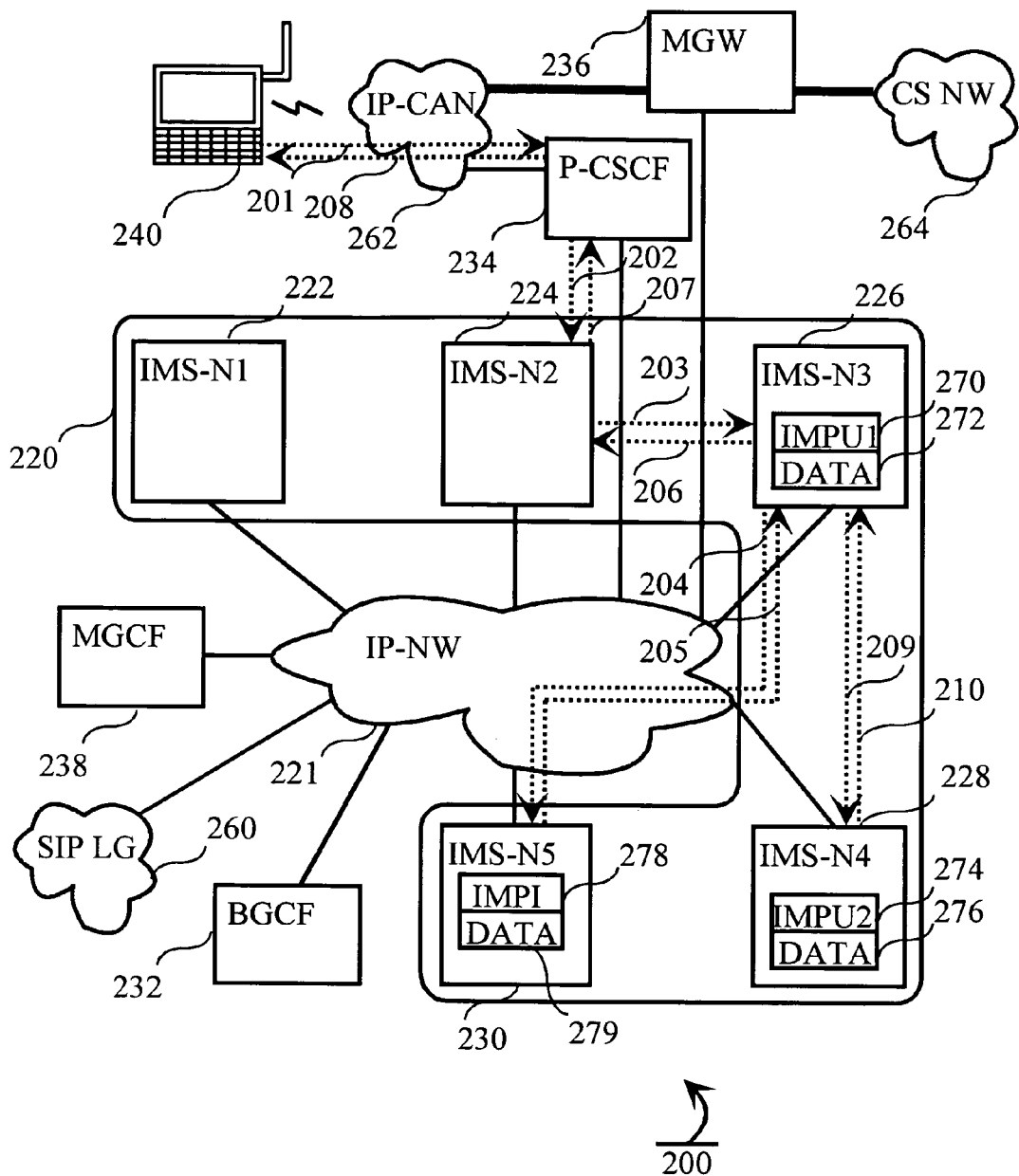
FIG. 2A is a block diagram illustrating a distributed IP Multimedia Subsystem (IMS) employing at least one Distributed Hash Table in one embodiment of the invention.

In FIG. 2A there is illustrated a distributed IP Multimedia Subsystem (IMS) 200. IMS 200 comprises an IP-CAN 262 that further comprises a radio access network which is, for example, a 2G GSM/EDGE radio access network or a 3G UMTS radio access network. An IP-CAN 262 can also been seen as to comprise both a packet switched core network functionality and an access network. The main issue is that an IP-CAN provides IP connectivity to user terminals towards an IP network such as the Internet or an Intranet. From IP-CAN 262 there is an access point (not shown), for example, to a Media Gateway (MGW) 236 and to a Proxy Call State Control Function (P-CSCF) 234. The access point for P-CSCF 234 is used to convey signaling traffic pertaining to IP multimedia.

IMS 200 is used to set-up multimedia sessions over IP-CAN. The network elements supporting IMS comprise at least one Proxy Call State Control Function (P-CSCF), at least one Brakeout Gateway Control Function (BGCF) and at least one Media Gateway Control Function (MGCF). IMS 200 comprises an IP network 221 in which IMS nodes form an overlay network 220. Overlay network 220 refers to the set of SIP peer-to-peer nodes that are logically linked appearing to be an exclusive SIP peer-to-peer network on top of IP network 221. There are five IMS nodes in overlay network 220, namely IMS nodes 222, 224, 226, 228 and 230. P-CSCF 234, Media Gateway (MGW) 236, Media Gateway Control Function (MGCF) 238 and a Breakout Gateway Control Function (BGCF) 232 are in communication with overlay network 220. Optionally, there is also at least one Application Server (not shown), which provides a variety of value-added services for mobile subscribers served by the IP multimedia subsystem (IMS). P-CSCF 234 receives signaling plane packets from IP-CAN 262. Session Initiation Protocol (SIP) signaling messages are carried in the signaling plane packets. The signaling message is processed by P-CSCF 234, which determines the correct serving network or a serving network element for the mobile station 240 that sent the signaling packet.

The IMS nodes in overlay network 220 act as controlling nodes for mobile stations. They handle subscriber service related issues as multimedia sessions are established towards mobile stations or when mobile stations set-up outgoing multimedia sessions. The services are determined and controlled based on public user identity data stored in IMS nodes of overlay network 220. The public user identity data may be used to determine the required trigger information that is used as criterion for notifying an application server. The trigger criteria are also referred to as filtering criteria. Application server may be notified on events relating to incoming registrations, incoming session initiations and outgoing session initiations.

Mobile Station (MS) 240 communicates via IP-CAN 262 with P-CSCF 234 and MGW 236. MGW 236 communicates with a Circuit Switched (CS) network 264. IMS nodes 222, 224, 226, 228 and 230 may also communicate with a SIP legacy network 260. The user at MS 240 has associated with it two IP Multimedia Public user Identities (IMPU), namely IMPU 270 and 274. The user is determined for MS 240, for example, using an identity module or a user interface dialogue based login procedure. By computing a hash key from IMPU 270 IMS node 226 is determined as the storage node for IMPU 270 and IMPU data 272. Similarly, by computing a hash key from IMPU 274 IMS node 230 is determined as the storage node for IMPU 274 and IMPU data 276 associated with it. The IMS node for a given IMPU may always be determined by computing the hash key and using the DHT to find the node responsible for the key range of the hash key.

The information associated with the user of MS 240 must first be created to overlay network 220 before MS 240 may register to the network and thereupon start or receive multimedia sessions. In the creation of an account creation for the user of MS 240 or any other user, the network operator in charge of overlay network 220 has to allocate at least the subscriber identity, at least one an IP Multimedia Private Identity (IMPI) and at least one IMPU for the user. The subscriber identity may comprise, for example, the user's full name, his social security number, an account number, or any other combination. Additionally, subscriber data is formed comprising, for example, billing info, name and a postal address. First, all subscriber related data is stored in a management system of the operator comprising a management node (not shown). Thereupon, IMPI 278, IMPU 270, and IMPU 274 are hashed, and their corresponding data entities 279, 272 and 276 associated with these identities are stored in the IMS nodes that corresponding to the hash keys. Also general subscriber data is stored to an IMS node by hashing the subscriber identity, for example, full name, a social security number or any unique identifier for the user. The data associated with a given identity is stored to the IMS node that is responsible for key range to which the identity belongs. IMPI 278 is stored in IMS node 230, IMPU 270 in IMS node 226 and IMPU 274 in IMS node 228. After the data related information entities and their associated identifiers IMPI 278, IMPU 270 and IMPU 274 are stored to the overlay network 220, MS 240 may become operational. The process is more closely described in association with FIG. 8.

Figure 3:
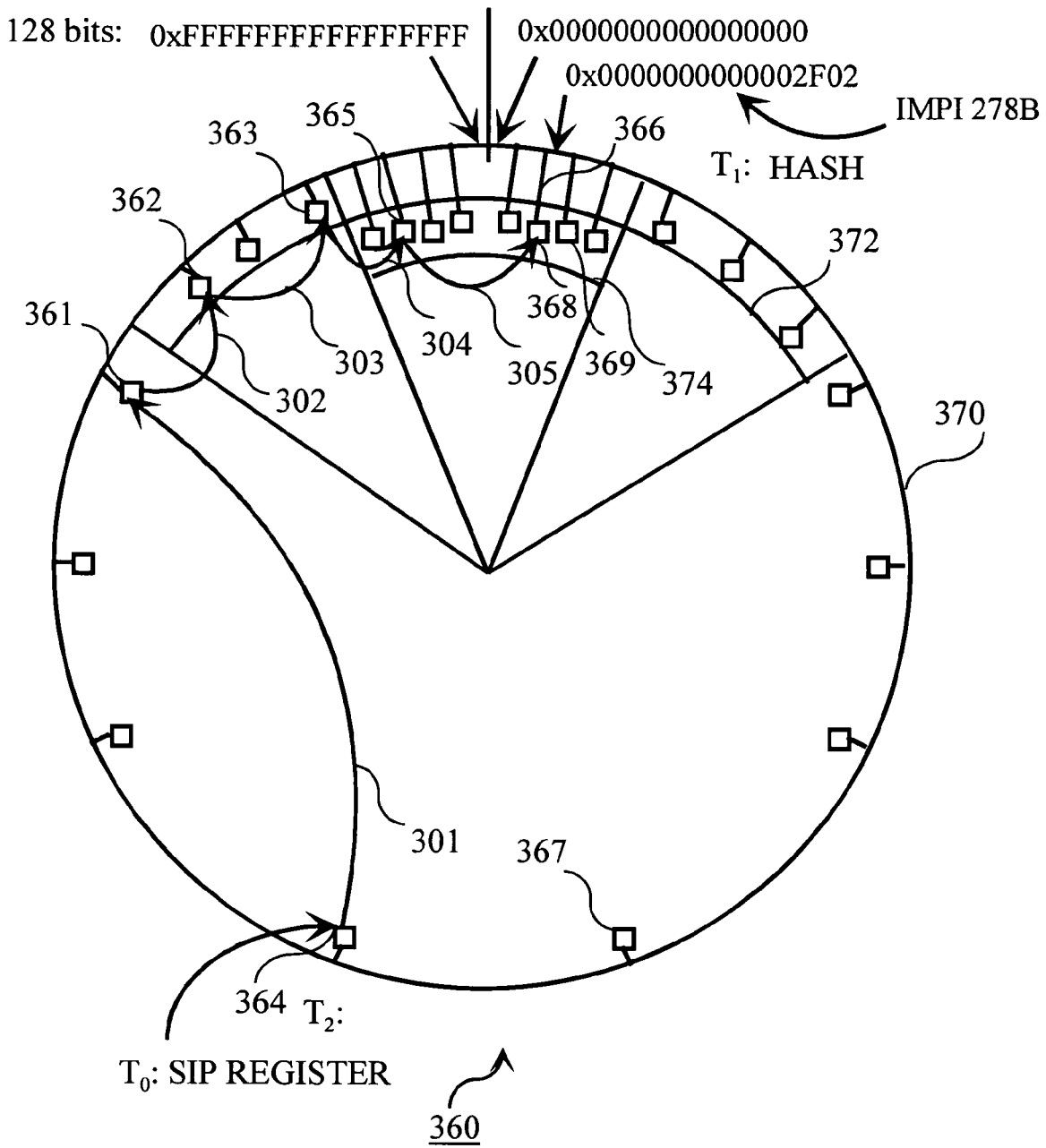
FIG. 3 is a block diagram illustrating a distributed hash table based signaling message routing in one embodiment of the invention.

In FIG. 2A MS 240 is initially powered on or enters the coverage area of the radio interface of IP-CAN 262. However, it should be noted that IP-CAN 262 may also be a fixed IP-CAN. In that case the entering of the coverage area may be replaced with the activation of SIP User Agent (UA) functionality in a fixed terminal. In response to the powering on or the entering of IP-CAN 262, MS 240 sends a SIP REGISTER message to P-CSCF 234 via IP-CAN 262. This is illustrated with arrow 201. SIP REGISTER message 201 comprises either IMPU 270 or IMPU 274 and may comprise an IMPI 278. P-CSCF 234 determines that the SIP REGISTER message must be sent to the distributed IMS, that is, to one of IMS nodes 222, 224, 226, 228 and 230 in overlay network 220. P-CSCF 234 obtains IMS node 224 IP address, for example, from the domain name part of IMPU 270 using Domain Name System (DNS). P-CSCF sends SIP REGISTER message to IMS node 224, as illustrated with arrow 202. The routing of the SIP REGISTER message in the distributed IMS uses a distributed hash table maintained by overlay network 220 composed of IMS nodes 222, 224, 226, 228 and 230. IMS node 224 computes a hash key using IMPU 270. Based on its cache IMS node 224 determines that the hash key belongs to the key range associated with IMS node 226. It may be assumed that in a small distributed IMS the IP address of the target IMS node may be found directly in the neighbor cache of the source IMS node. In this case the target IMS node is IMS node 226 and the source IMS node is IMS node 224. However, in a larger distributed IMS several routing steps may be required to find the node responsible for the key range to which the IMPU to be registered belongs. However, due to the fact that the hash key may not be carried in SIP REGISTER messages, each of the IMS nodes in the path towards the target IMS node may need to compute the hash key using the IMPU in the SIP REGISTER message. In one embodiment of the invention, this is avoided by carrying the hash key in the SIP REGISTER messages. The traversal of multiple nodes is illustrated in FIG. 3. IMS node 224 sends SIP REGISTER message to IMS node 226, as illustrated with arrow 203. In response to receiving SIP REGISTER message 203, IMS node 226 repeatedly computes the hash key using IMPU 270 and obtains IMPU data 272 comprised in the value stored in association with the hash key. The IMPU data 272 contains at least one Private User Identity IMPI 278 which is at the user's disposal to be authenticated in the network. IMS node 226 stores certain information to the IMPU data obtained in the SIP REGISTER message such as registration status, the P-CSCF address, the MS 240 contact address, which is, for example, a SIP URI containing an IP address or a Fully Qualified Domain Name (FQDN). Presence information is also updated accordingly. In response to the registration IMS node 226 acknowledges the registration via the IMS nodes that processed the SIP REGISTER message or issues an authentication request to MS 240. This depends on whether authentication is required or not. The authentication is an optional step in the registration procedure.

An authentication request requires that IMS node 226 downloads one or more authentication vectors linked with the Private User Identity IMPI 278 that is associated with the Public User Identity IMPU 270 being registered. In order to request authentication vectors, IMS node 226 is required to compute the hash of the Private User Identity 278 and use it as a hash key to find IMS node 230 from the cache. IMS node 230 stores the IMPI data 279 that comprises the list of Public User Identities IMPU 270 and 274, and authentication vectors used for authenticating the user. This request for IMPI data 279 is illustrated with arrow 204. The response, containing the IMPI data 279 for IMPI 278 is sent to IMS node 226 in a response message illustrated with arrow 205. IMS node 226 extracts an authentication vector from IMPI data 279 and creates a SIP response that contains an authentication challenge. The downloading of IMPI data 279 using IMPI 278 may use any protocol, for example, SIP or the Hypertext Transfer Protocol (HTTP) defined by IETF. The response to the registration is sent in the reverse direction via the nodes that participated in the forwarding of the SIP REGISTER message. This is illustrated with arrows 206, 207 and 206. The authentication request is carried in the form of a SIP 401 Unauthorized message, whereas an acknowledgement is sent in the form of a SIP 200 OK message. When the SIP 401 Unauthorized message is received by MS 240, it responds with a new SIP REGISTER message which contains the authentication response. The new SIP REGISTER message traverses the P-CSCF and the same IMS nodes all the way to IMS node 226 as the original SIP REGISTER message.

The user of MS 240 has an implicitly registered set, to which IMPU1 and IMPU2 belong. An implicitly registered set may not, however, always be associated with a subscriber identity. In the case of an implicitly registered set, particularly in the case of the user of MS 240, registration must be performed also for IMPU2 whenever IMPU1 is registered and vice versa. The existence of an implicitly registered set for an IMPU may be revealed in the IMPU data associated with the IMPU, but in general, it is stored within IMPI data associated with an IMPI. If an indicator does not indicate an IRS, there is no need to find other IMPUs. The registration for IMPU1 is followed by a registration for IMPU2, which is performed by IMS node 226 as a third party registration. For routing the SIP REGISTER message to the IMS node storing IMPU data 276 for IMPU 274, IMS node 226 computes a hash key using IMPI 278 and finds from the distributed hash table IMPI data 279 containing the IMPUs associated with the IMPI 278. As noted, the checking of IMPI may be avoided with a flag indicating IRS status for an IMPU. In this case IMPU 274 is found.

IMS node 226 creates a third party SIP REGISTER message to each of the IMPUs obtained from IMPI data 279. In FIG. 2A this consists only of IMPU 274. The SIP REGISTER message is routed to the IMS node that is responsible for storing the hash key for IMPU 274. IMS node 226 computes the hash key for IMPU 274. By using its cache, IMS node 226 determines IMS node 228 as responsible for the key range to which hash key computed using IMPU 274 belongs. In large distributed IMS networks the determination may involve several hops between IMS nodes to reach the responsible IMS node. IMS node 226 sends SIP REGISTER message to IMS node 228, as illustrated with arrow 209. IMS node 228 obtains from the received SIP REGISTER message the contact information, for example, an IP address of MS 240, routing information, for example, address of P-CSCF 234, registration status, presence information data plus other relevant information and stores them to IMPU data 276. The SIP REGISTER message is acknowledged with messages 210 to IMS node 226.

In one embodiment of the invention, it may be summarized that the registration comprises IMS node 226 retrieving authentication vectors from node 230, IMS nodes 226 and 228 storing the contact address of MS 240, the address of the P-CSCF 234, registration status, and supplied presence information on the user obtained from a received REGISTER message from the user of MS 240.

Figure 2B:
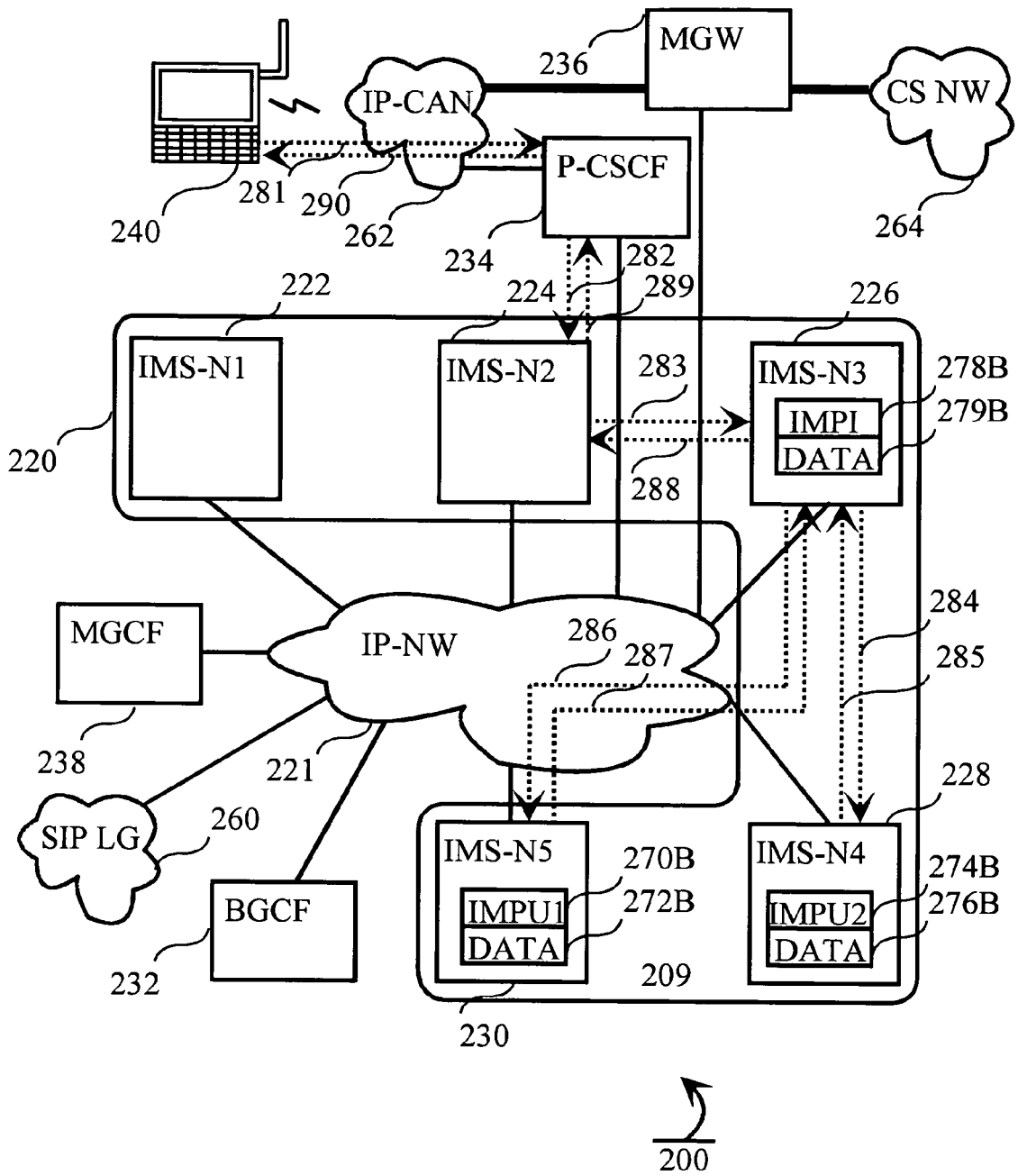
FIG. 2B is a block diagram illustrating a distributed IP Multimedia Subsystem (IMS) employing at least one Distributed Hash Table to perform multi-identity registration in one embodiment of the invention.

FIG. 2B is a block diagram illustrating a distributed IP Multimedia Subsystem (IMS) employing at least one Distributed Hash Table to perform multi-identity registration in one embodiment of the invention.

In the embodiment of FIG. 2B, the IMS node responsible for the hash key range to which IMPI belongs and which stores IMPI data associated with IMPI is first provided with the SIP REGISTER message via the DHT routing. From there the registration is relayed to the IMS nodes responsible for IMPU data. The embodiment of FIG. 2B is optimized to the case where there are in most cases implicitly registered sets and multiple IMPUs for a subscriber identity. An additional benefit is that authentication vectors associated with users IMPI are available in the IMS node first receiving the SIP REGISTER message.

In FIG. 2B MS 240 has associated with it two IP Multimedia Public user Identities (IMPU), namely IMPU 270B and 274B. By computing a hash key from IMPU 270B IMS node 230 is determined as the storage node for IMPU 270B and IMPU data 272B associated with it. Similarly, by computing a hash key from IMPU 274B IMS node 228 is determined as the storage node for IMPU 274B and IMPU data 276B associated with it. The IMS node for an IMPU may always be discovered by computing the hash key and using the DHT to find the node responsible for the key range of the hash key.

In FIG. 2B MS 240 is initially powered on or enters the coverage area of the radio interface of IP-CAN 262. In response to the powering on or the entering of IP-CAN 262, MS 240 sends a SIP REGISTER message to P-CSCF 234 via IP-CAN 262. This is illustrated with arrow 281. SIP REGISTER message 281 comprises an IMPI 278B and either IMPU 270B or IMPU 274B. P-CSCF 234 determines that the SIP REGISTER message must be sent to overlay network 220, that is, to one of IMS nodes 222, 224, 226, 228 and 230. It should be noted that an overlay network may comprise any number of nodes. P-CSCF 234 obtains IMS node 224 IP address, for example, from the domain name part from IMPI 278B or either IMPU 270B or IMPU 274B using the Domain Name System (DNS). P-CSCF 234 sends SIP REGISTER message to IMS node 224, as illustrated with arrow 282. The IP address of IMS node 224 has been returned by the DNS. Different IMS node addresses may be returned by the DNS, for example, in a round robin fashion or attached with priorities. The routing of the SIP REGISTER message in the distributed IMS uses a distributed hash table maintained by overlay network 220 comprising IMS nodes 222, 224, 226, 228 and 230. IMS node 224 computes a hash key using IMPI 278B. Based on its cache IMS node 224 determines that the hash key belongs to the key range associated with IMS node 226. It may be assumed that in a small distributed IMS the IP address of the target IMS node may be found directly in the neighbor cache of the source IMS node. In this case the target IMS node is IMS node 226 and the source IMS node is IMS node 224. However, in a larger distributed IMS several routing steps may be required to find the node responsible for the key range to which IMPI 278B to be registered belongs.

However, due to the fact that the hash key may not necessarily be carried in SIP REGISTER messages, each of the IMS nodes in the path towards the target IMS node must compute the hash key using IMPI 278B in the SIP REGISTER message. The traversal of multiple nodes is illustrated in FIG. 3. IMS node 224 sends SIP REGISTER message to IMS node 226, as illustrated with arrow 283.

In response to receiving SIP REGISTER message 283, IMS node 226 repeatedly computes the hash key using IMPI 278B and obtains IMPI data 279B comprised in the value stored in association with the hash key. IMPI data 279B comprises a list of IMPUs and authentication vectors for the subscriber identity related with MS 240. These IMPUs are IMPU 270B and IMPU 274B in FIG. 2B. There is also an indication that these IMPUs belong to an implicitly registered set. Therefore, registration must be performed for both IMPUs. If there is no such indication the registration proceeds simply to the IMPU identified in the SIP REGISTER message from MS 240. However, possible authentication of MS 240 may be performed by IMS node 226 as in the case illustrated in FIG. 2A. In FIG. 2B it is assumed that the IP addresses of IMS nodes 228 and 230 are stored in the DHT cache within IMS node 226. IMS node 226 determines IMS node 230 for IMPU 270B and IMS node 228 for IMPU 274B. If the IP addresses or FQDNs for IMS nodes 228 and 230 are not in the DHT cache of IMS node 226 the traversal of multiple IMS nodes may be required as in the case of SIP REGISTER message first reaching IMS node 226. After the destination IMS node determination, IMS node 226 sends SIP REGISTER messages to IMS nodes 230 and 228, as illustrated with arrows 286 and 284, respectively. IMS nodes 230 and 228 obtain the IMPU data. Registration status, P-CSCF 234 address, contact address of MS 240 and presence status obtained in the SIP REGISTER message are typically stored to IMPU data 272B in node 230 and IMPU data 276B in node 228. In response to the registration IMS nodes 228 and 230 acknowledge the registration to IMS node 226, as illustrated with arrows 285 and 287, respectively. The response to the registration is sent in the reverse direction from IMS node 226 via the nodes that participated in the forwarding of the SIP REGISTER message. This is illustrated with arrows 288, 289 and 290. The final acknowledgement may be sent only after it has been determined that the registrations of IMPU 270B and 274B succeeded.

FIG. 3 is a block diagram that illustrates a distributed hash table based signaling message routing in one embodiment of the invention.

Distributed Hash Table (DHT) 360 is stored on a number of nodes such as IMS nodes 361, 362, 363, 364, 365, 367, 368 and 369. These nodes store data in a distributed fashion. In FIG. 3 there is illustrated a circle 370, which represents the key space of distributed hash table 360. In FIG. 3 the key space size is 128 bits. The key space size may also be any number of bits. In order to store a value in distributed hash table 360, a key is computed using the value with a hash function. The key is a number in the 128 bits key space.

Each node participating in the distributed hash table is assigned a key which is referred to as the identifier of the node. A range of keys around that identifier are assigned to the node. All values that have a hash key which falls within the key range of a given node are stored to that node. In order to provide robustness, a number of different nodes maybe assigned to be in charge of the same key space range. For example, there maybe two nodes which are in charge of a given key space range and are able to route a query carrying a hash key to the right node. It should be noted that the keys belonging to the responsibility of a node may also comprise a non-sequential set of key that may be obtained using the identifier.

Each node must store some information on other nodes that participate in the distributed hash table. The information on other nodes maybe arranged as a cache. The density of hash keys and corresponding IP addresses in the cache of a node is usually inversely proportional to the distance of the keys from the key of that node. The cache may be arranged to have a number of levels. The densities of the hash keys with a stored IP address are dependent on the level, in other words, the densities of the node identifier keys are dependent on the level. The highest level represents the entire key space. The lowest level represents the immediate neighbors of the node in terms of the key space assigned to them. In FIG. 3 there are three levels. The highest level is key range 370. The middle level is represented by arc 372. The lowest level is represented by arc 374. A distributed hash table offers two logical operations, namely a PUT operation and a GET operation. The syntax of PUT operation is PUT(key, value), wherein key is the hash key and the value is the value to be stored to the node which has the responsibility for the key. The value is obtained by providing the key to the distributed hash table with the GET operation. The syntax of GET operation is value=GET (key), wherein the key is an access key computed and value is the associated value returned by the distributed hash table. A hash key is computed, for example, using the US Secure Hash Algorithm 1 (SHA 1) or any other hash function. Secure hash algorithms are also the SHA and the HMAC-SHA defined by IETF.

In FIG. 3 there is illustrated how an IMS node storing IMPI 278B and IMPI data 279B may be reached with registration signaling using DHT 360 as a signaling network. Signaling comprises, for example, registration and session set-up signaling. The registration message may, for example, be a SIP REGISTER message. Hash keys for routing signaling messages may be computed also from other identities such as IMPUs, E-mail addresses, SIP-URIs or TEL-URIs to obtain storage servers for data relating to these identities.

At time $T_0$, a SIP REGISTER message arrives to an initial contact node of an overlay network formed by IMS nodes 361, 362, 363, 364, 365, 367, 368 and 369. The overlay network comprises in this case the nodes implementing DHT 360. The initial contact node is IMS node 364, which receives the SIP REGISTER message from a P-CSCF (not shown).

At time $T_1$, a hash key is computed using IMPI 278B. The IMS node closest to the hash key shall store IMPI 278B and associated IMPI data 279B. In this case the IMS node to hold the hash key is node 368.

At time $T_2$ IMS node 364 wishes to route the SIP REGISTER message to IMS node 368 that currently stores IMPI 278B and associated IMPI data 279B. Therefore, IMS node 364 computes the hash key using IMPI 278B. Using the hash key node 364 determines from its cache the IMS node which is closest to the hash key in terms of key space and the hash key values assigned to the IMS node. Therefore, IMS node 364 determines IMS node 361 and sends the SIP REGISTER message to IMS node 361 as illustrated with arrow 301.

IMS node 361 repeatedly computes the hash key using IMPI 278B. Node 361 determines using the hash key again an IMS node that in its cache is closest to the hash key. IMS node 361 determines IMS node 362 as the closest IMS node and sends the SIP REGISTER message to it as illustrated with arrow 302.

IMS node 362 repeatedly computes the hash key using IMPI 278B. IMS node 362 determines IMS node 363 and sends the SIP REGISTER message to it, as illustrated with arrow 303.

IMS node 363 repeatedly computes the hash key using IMPI 278B. IMS node 363 determines node 365 and sends the SIP REGISTER message to it, as illustrated with arrow 304.

IMS node 365 repeatedly computes the hash key using IMPI 278B. Finally, IMS node 365 determines that IMS node 368 is in its neighbor cache and that IMS node 368 is in charge of the key range comprising the hash key. Therefore, IMS node 365 sends the SIP REGISTER message to IMS node 368, as illustrated with arrow 305.

In one embodiment of the invention, the SIP REGISTER message or another signaling message comprises as a parameter the hash key computed using the target identity such as IMPI 278B, an IMPU or another similar identifier.

Figure 4:
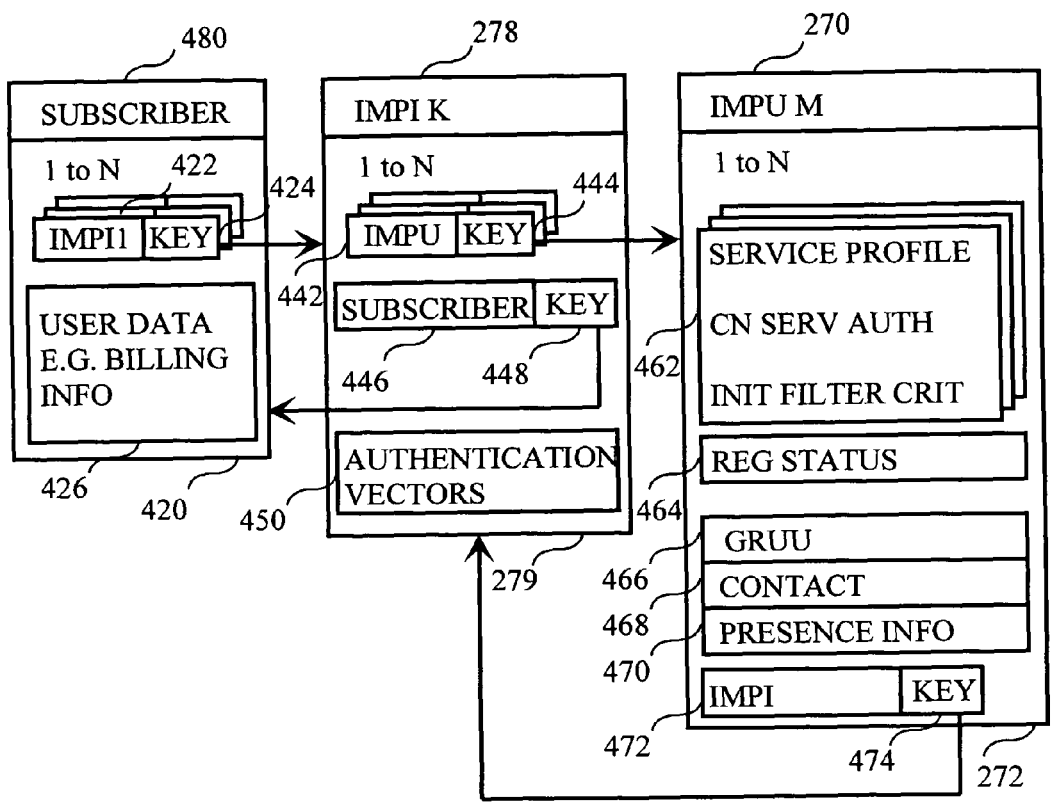
FIG. 4 is a block diagram illustrating the subscription related data structures for a distributed IMS in one embodiment of the invention.

FIG. 4 is a block diagram illustrating the subscription related data structures for a distributed system in one embodiment of the invention. In the following description "hash key" may refer to any key mathematically derived from a source datum and "hashing" may refer to any such mathematical operation. IMS and related terminology is used as an example only, and should not be construed as limiting the invention to IMS subscriber information handling.

In FIG. 4 there is a data structure for a subscriber data 420 associated with subscriber identity 480, subscriber data 279 associated with IMPI 278 and IMPU data 272 for an IMPU 270. It should be noted that IMPU data for IMPUs 274, 270B and 274B is structurally similar. Subscriber data 420 representing data associated with subscriber identity 480 comprises an integer number N of pairs comprising an IMPI 422 and the hash key 424 for the IMPI. The hash key 424 is used to find the IMPI from the distributed IMS DHT. In data structure 420 there is also miscellaneous user data 426, for example, billing data and address information.

In one embodiment of the invention, subscriber data 420 may be obtained by IMS nodes using hash key 448 from the IMS node that stores the subscriber identity 480 and the associated subscriber data 420 via DHT, whenever there is a need to obtain or modify this general information. For example, whenever a new IMPI is allocated to the user, or whenever the billing information or user's address change.

IMPI data 279 representing data associated with an IMPI may comprise an integer N number of pairs comprising IMPU 442 and hash key 444. Hash key 444 is created by hashing IMPU 442. In the figures, IMPU 270 is the same information as IMPU 442. IMPI data 279 may contain one or more authentication vectors 450 which may be used to authenticate the user. The hash key 444 is used to find the IMPU 270 from the distributed IMS DHT. There may also be an entry identifying the subscriber identity 446 and the hash key 448 for the subscriber identity. The hash key 448 is used to find the subscriber identity 480 and associated subscriber data 420 in the IMS DHT. This acts as a reverse link.

IMPU data 272 representing data associated with an IMPU 270 may comprise e.g. an integer N number of service profiles such as service profile 462. IMPU data 272 may also comprises a registration status 464. A service profile may comprise core network service authorization and a number of Initial Service Criteria for contacting an application server of the IMS. Data structure 472 may also comprise a Globally Routable Unique URI (GRUU) 466 which is used to set up session to a specific mobile station. There may also be contact URI 468 and presence information 470 in data structure 472.

There may also be reverse link hash key 474 to the IMPI 278 to which the IMPU is associated. In the figures, IMPI 278 and IMPI 472 are the same value.

Thus, it may be summarized that FIG. 4 contains subscriber identity 480 and its associated subscriber data 420; IMPI 278 and its associated data IMPI data 279; and IMPU 270 and its associated data 272. Subscriber data 420 comprises one or more IMPIs 422 and associated hash keys 424. The value of IMPI 422 is the same as IMPI 278, although they may be stored in different data structures. Thus, IMPI 422 acts as a forward link. IMPI data 279 stores subscriber identity 446 and subscriber key 448. The value of subscriber identity 446 is the same as subscriber identity 480, acting as a reverse link. IMPI data 279 also stores one or more IMPU 442 and its associated hash key 444. The value of IMPU 442 is the same as IMPU 270, although these are stored in different data structures. Thus, IMPU 442 acts as a forward link. IMPU data 272 comprises one or more IMPI 472 and its associated hash key 474. The value of IMPI 472 is the same as IMPI 278, thus, IMPI 472 acts as a reverse link.

In one embodiment of the invention, subscriber identity 480 and optionally also the associated data 420 are stored on a medium separate from the DHT. This may be done to facilitate searches to the subscriber database using incomplete information, such as locating a group of subscribers with the same last name. Such a medium may take the form of a centralized data storage server.

Figure 5A:
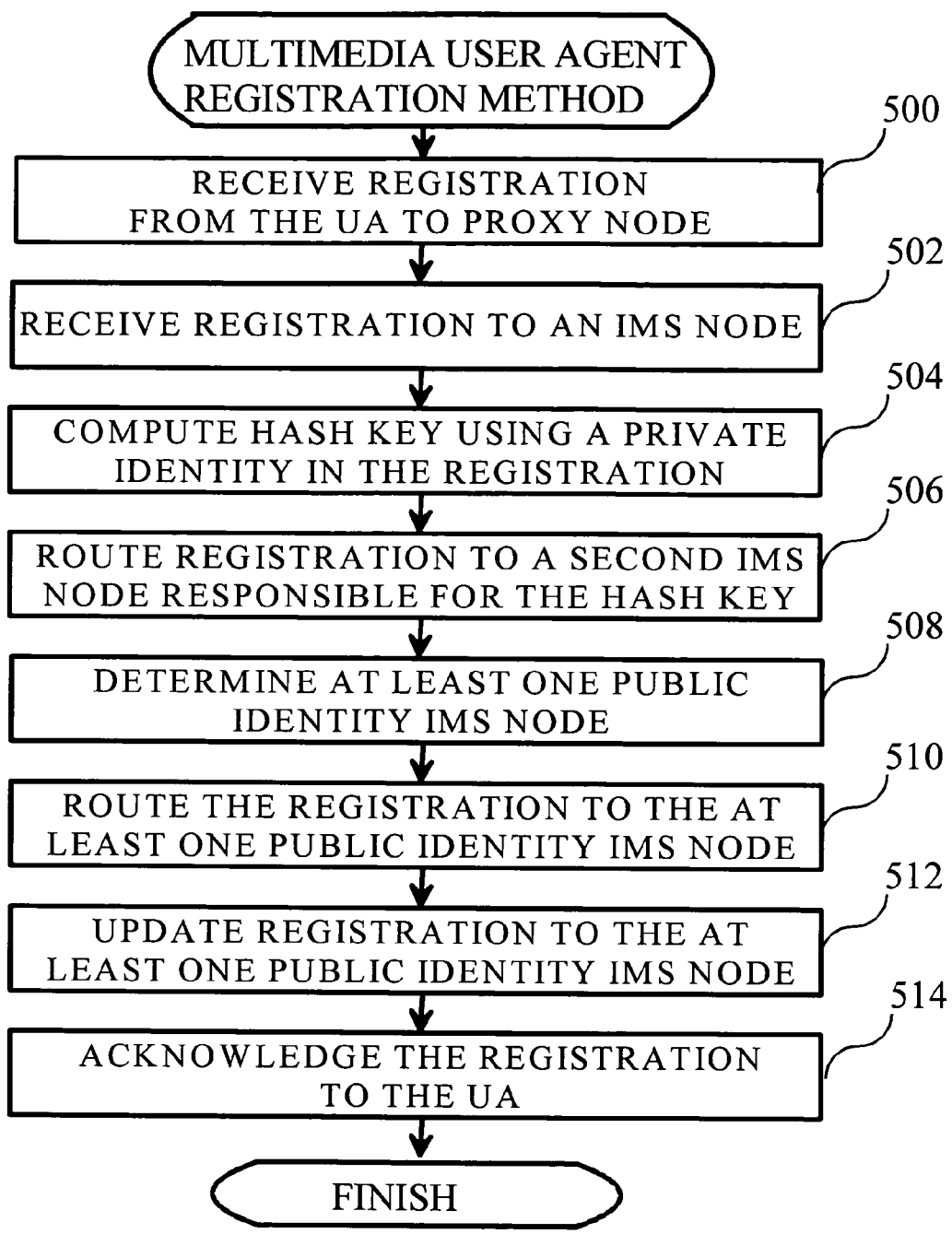
FIG. 5A is a flow chart illustrating a method for the registration of a user agent starting from a private user identity in a distributed IP Multimedia Subsystem (IMS) in one embodiment of the invention.

FIG. 5A is a flow chart illustrating a method for the registration of a user agent starting from a private user identity in a distributed IP Multimedia Subsystem (IMS) in one embodiment of the invention.

At step 500 a SIP REGISTER message is received by a proxy node such as a P-CSCF. The SIP REGISTER message originates from a SIP User Agent (UA) such as a mobile station. The SIP REGISTER message comprises at least one identity of the user of the mobile station. In one embodiment of the invention, there may be a private identity and at least one public identity. The P-CSCF determines a first IMS node to receive the registration, for example, by performing DNS resolution for the FQDN part of one of the at least one identity. The identity may be a private identity for the UA. The DNS resolution provides the address of the first IMS node. The P-CSCF forwards the SIP REGISTER message to the first IMS node.

At step 502 the SIP REGISTER message is received by the first IMS node.

At step 504 the first IMS node computes a hash key KEY=SHA1(identity) using the identity as input to the hash function. The hash function may be any cryptographic hash function such as MD5 or SHA1. The identity may be the private identity or a public identity.

At step 506 the first IMS node start forwarding the SIP REGISTER towards an IMS node responsible for the key range to which the hash key belongs. The forwarding may involve a number of IMS nodes each of which provide the SIP REGISTER message to an IMS node closer to the key range to which the hash key belongs. If the hash key is not sent in the SIP REGISTER message, each IMS node forwarding the SIP REGISTER message must repeatedly compute the hash key. Finally, the node responsible for the key range to which the hash key belongs receives the SIP REGISTER message. This is called a second IMS node.

At step 508 the second IMS node repeatedly computes the hash key using the identity, for example, the private identity. From the data associated with the hash key the second IMS node obtains information on at least one IMS node storing the data associated with a public user identity for the user associated with the UA. These may be referred to as public user identity IMS nodes. If no implicit registration set is defined for a public user identity provided in the SIP REGISTER message, the registration is performed only to the IMS node responsible for storing data related to that public user identity. In one embodiment of the invention, the user is also authenticated. The authentication is performed, for example, using the Generic Authentication Architecture (GAA) defined by 3GPP. In one embodiment of the invention, other authentication methods, such as HTTP Digest authentication, Early IMS security solution and Network Attachment Subsystem (NASS) bundled authentication may be used. The authentication comprises a message exchange between the UA and the second IMS node.

At step 510 the SIP REGISTER message is forwarded to each IMS node in charge of a public user identity for the user. That is, the registration is routed to the at least one public user identity IMS node.

At step 512 the public user identities are updated to registered status in the at least one public user identity IMS node. The IMS node stores the contact address of the user of SIP UA, address of the P-CSCF serving the user, presence information, and other relevant information. The at least one public user identity IMS node acknowledges the registration to the second IMS node.

At step 514 the registration is acknowledged with SIP 200 OK message to the user agent in response to successful authentication or simply the registration request.

In one embodiment of the invention, a public user identity is used to compute the hash key for obtaining directly an IMS node, which is in charge of storing the data associated to the public user identity. From the public user identity data it is checked if more than one identity belongs to same implicitly registered set of identities. If there is only a single identity, the method is finished. A second further IMS node storing the information on the other identities is discovered, for example, by sending a SIP REGISTER message to the second IMS node via the DHT routing mechanism. The routing may be based on a high-level identity, which is superior to the registration identities, for example, IMPUs. Information on this high-level identity is stored in association with the data on the registration identities. If there is more than one registration identity stored in association with the high-level identity in the second IMS node, the method continues. A hash key for another registration identity is read from the value associated with the high-level identity hash key.

In one embodiment of the invention, there is no high-level identity which would have associated with it the identities to be implicitly registered, but instead the registration message provides all the identities to be registered.

Figure 5B:
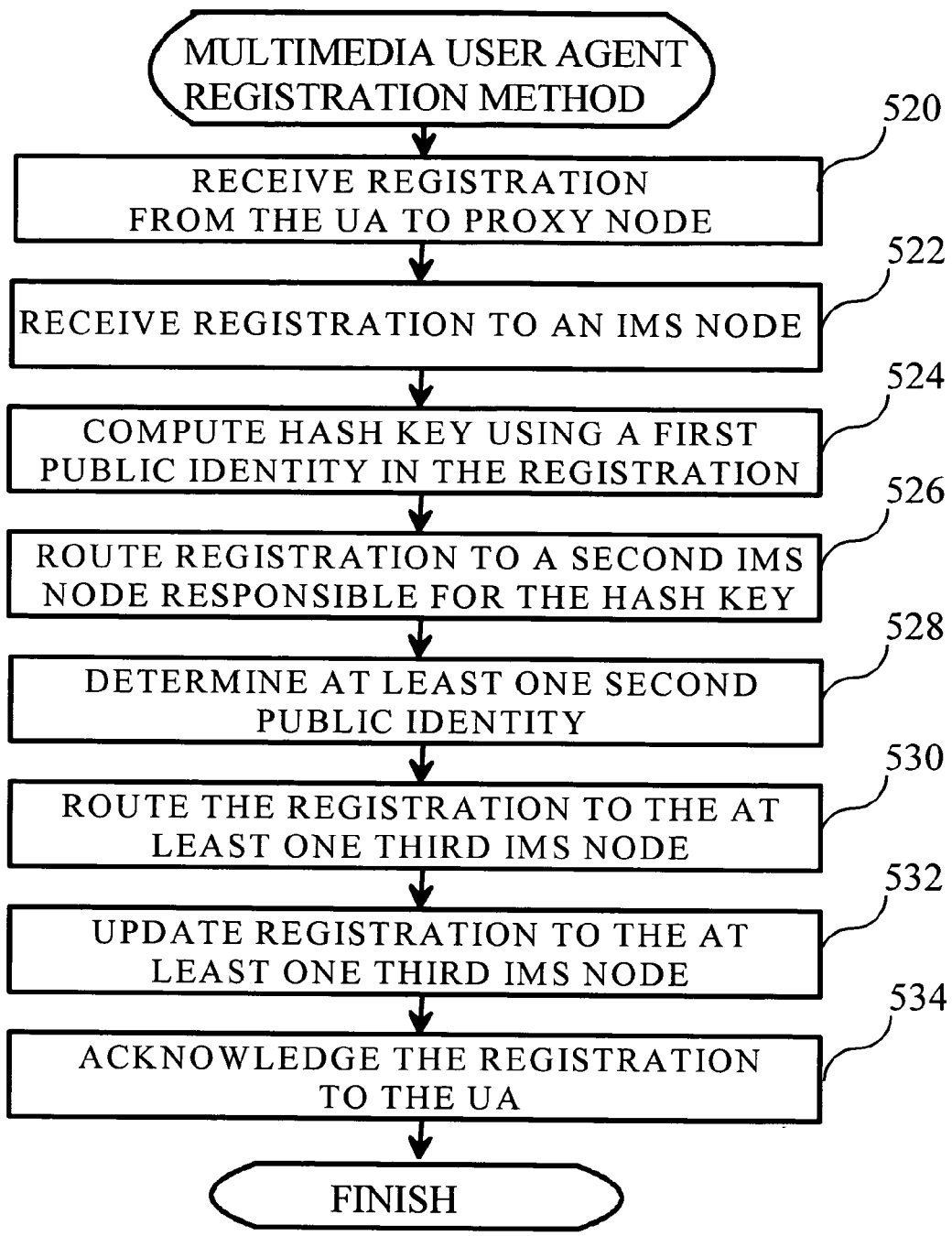
FIG. 5B is a flow chart illustrating a method for the registration of a user agent starting from a public user identity in a distributed IP Multimedia Subsystem (IMS) in one embodiment of the invention.

FIG. 5B is a flow chart illustrating a method for the registration of a user agent starting from a public user identity in a distributed IP Multimedia Subsystem (IMS) in one embodiment of the invention.

At step 520 a SIP REGISTER message is received by a proxy node such as a P-CSCF. The SIP REGISTER message originates from a SIP User Agent (UA) such as a mobile station. The SIP REGISTER message comprises at least one public user identity, for example, at least one IMPU of the user of the mobile station. A public user identity is referred to in the description of FIG. 5B as an IMPU for brevity, but it may be any kind of a public user identity, for example, a SIP-URI or a TEL-URI. There is at least a first IMPU in the SIP REGISTER message. The P-CSCF determines a first IMS node to receive the registration, for example, by performing DNS resolution for the FQDN part of one of the first IMPU. The DNS resolution provides the address of the first IMS node. The P-CSCF forwards the SIP REGISTER message to the first IMS node.

At step 522 the SIP REGISTER message is received by the first IMS node.

At step 524 the first IMS node computes a hash key KEY=SHA1(first IMPU) using the first IMPU as input to the hash function. The hash function may be any cryptographic hash function such as MD5 or SHA1.

At step 526 the first IMS node start forwarding the SIP REGISTER towards an IMS node responsible for the key range to which the hash key belongs. The forwarding may involve a number of IMS nodes each of which provide the SIP REGISTER message to an IMS node closer to the key range to which the hash key belongs. If the hash key is not sent in the SIP REGISTER message, each IMS node forwarding the SIP REGISTER message must repeatedly compute the hash key. Finally, the node responsible for the key range to which the hash key belongs receives the SIP REGISTER message. This is called a second IMS node.

At step 528 the second IMS node repeatedly computes the hash key using the first IMPU. From the IMPU data associated with the hash key the second IMS node obtains information on at least one second IMPU. The second IMS node may also obtain from the data associated with the hash key a further hash key, which points to a data structure stored by a fourth IMS node. The fourth hash key has been computed previously, for example, using an IMPI or a subscriber identity. The second IMS node obtains the data associated with the further hash key from the fourth IMS node. From the IMPU data or the data from the fourth IMS node determines at least one second IMPU and information whether the at least one second IMPU must be registered together with the first IMPU. If there are no such second IMPUs to be registered, the method is finished. Hash key are computed using the at least one second IMPU.

At step 530 the SIP REGISTER message is forwarded to each IMS node in charge of a second IMPU for the user. That is, the registration is routed to the at least one third IMS node determined in the DHT using the hash keys computed using the at least one second IMPU.

At step 532 the at least one second IMPU is updated to registered status in the at least one third IMS node. The third IMS node stores the contact address of the user of SIP UA, address of the P-CSCF serving the user, presence information, and other relevant information. The at least one third IMS node acknowledges the registration to the second IMS node.

At step 534 the registration is acknowledged with SIP 200 OK message to the user agent.

Figure 6:
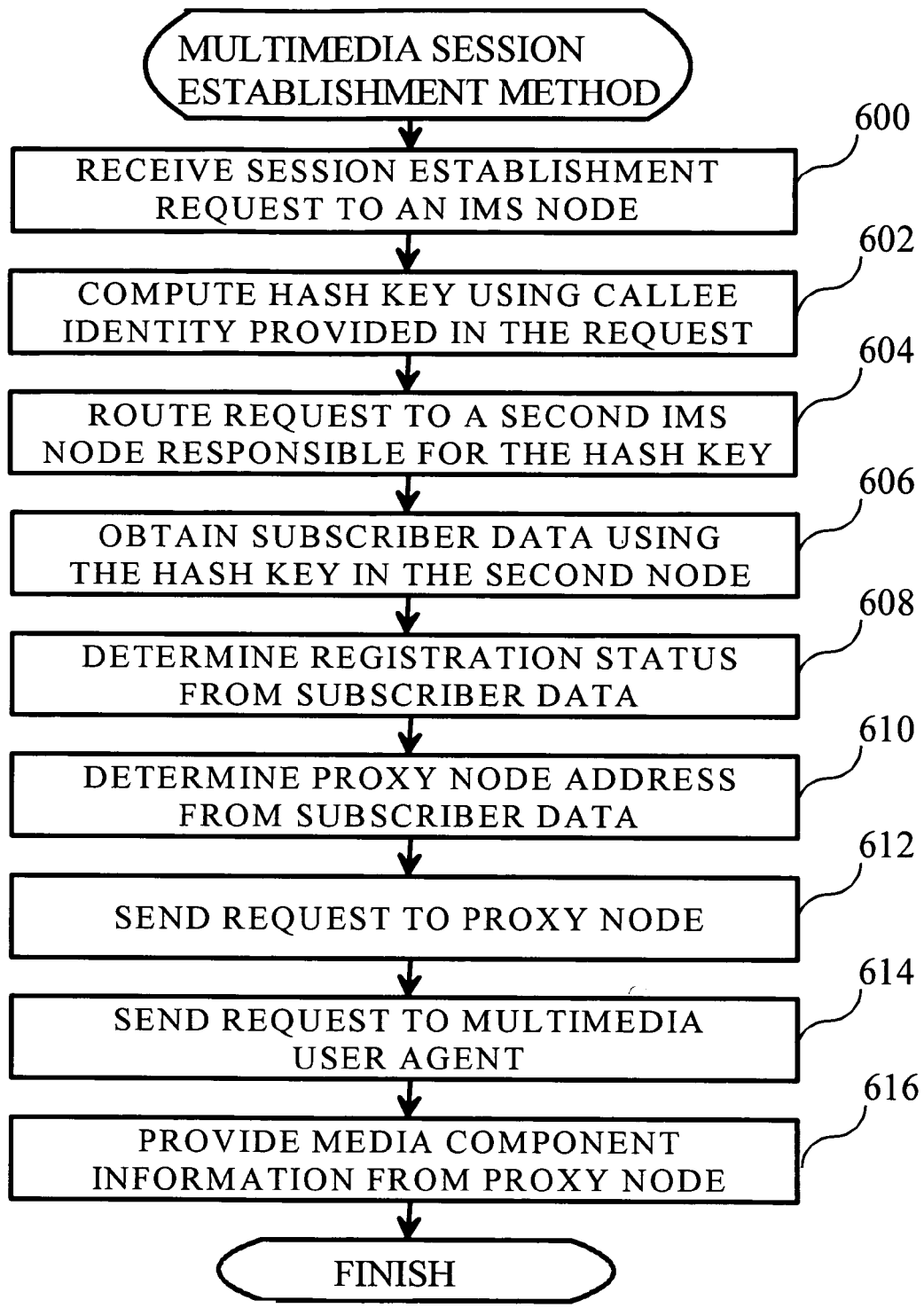
FIG. 6 is a flow chart illustrating a method for the establishment of multimedia sessions in a distributed IP Multimedia Subsystem (IMS) in one embodiment of the invention.

FIG. 6 is a flow chart illustrating a method for the establishment of multimedia sessions in a distributed IP Multimedia Subsystem (IMS) in one embodiment of the invention.

At step 600 a session establishment request message is received to an IMS node, which belongs to a distributed IMS that employs DHT for SIP message routing. The session establishment request is, for example, a SIP INVITE message. The SIP INVITE message is received, for example, from a P-CSCF which communicates with an IP-CAN. The message may also originate from a SIP server in an external SIP network. The SIP INVITE message carries a called party identity, that is, a callee identity in SIP parlance. The callee identity is, for example, a SIP-URI which represents one of the IMPU associated with the called party persona.

At step 602 the IMS node computes a hash key using the called party identity.

At step 604 the IMS node determines from its DHT cache the IMS node the key range of which is closest to the hash key. If an IMS node is found that is responsible directly for the key range to which the hash key belongs, the SIP INVITE is sent to it. If this is not the case, however, the SIP INVITE is sent to the IMS node the key range of which is closest to the hash key. The same process is repeated in the IMS node that received the SIP INVITE message. The hash key computation and cache lookup procedures are repeated until the IMS node responsible for the key range is reached.

At step 606 the destination IMS node starts processing the SIP INVITE message and computes the hash key using the called party identity. This time it obtains the value associated with the hash key. The value comprises the IP Multimedia public user identity (IMPU) data.

At step 608 the IMS node determines the registration status from the IMPU data. In one embodiment of the invention, the IMPU data is associated to the public user identity of the called party. If the subscriber, that is, the user is not registered, a negative SIP response message is sent to the caller. The negative response follows the same path as the SIP INVITE in reverse direction. Possible initial filter criteria for contacting an AS regarding the SIP INVITE are determined. If AS must be contacted the SIP INVITE is sent to an AS in order to implement a number of supplementary services.

At step 610 the P-CSCF address is obtained from the subscriber data.

At step 612 the SIP INVITE message is sent to the P-CSCF.

At step 614 the SIP INVITE message is sent from the P-CSCF towards the SIP User Agent of the called party. The called party may be a fixed UA or a mobile station.

At step 616 the P-CSCF receives from a policy decision function a request for information on the media components associated with the SIP session being established. The session is identified with an identifier such as an authorization token. Based on the information provided by the P-CSCF, a policy decision function determines what bandwidth and QoS classes may be admitted to the session. Thus, by being able to obtain session media component information from the P-CSCF, the policy decision function associated with the IP-CAN is able to associate QoS and other capacity allocations with actual sessions taking place. This is not possible in the case of a session and media component agnostic IP-CAN and IMS combination. The bandwidth and capacity allocations may be justified by means of actual sessions taking place. It is not possible for user terminals to become resource hogs for traffic that has not been admitted by a higher-level entity. For unspecific needs a certain restricted default bandwidth may be made available.

Figure 8:
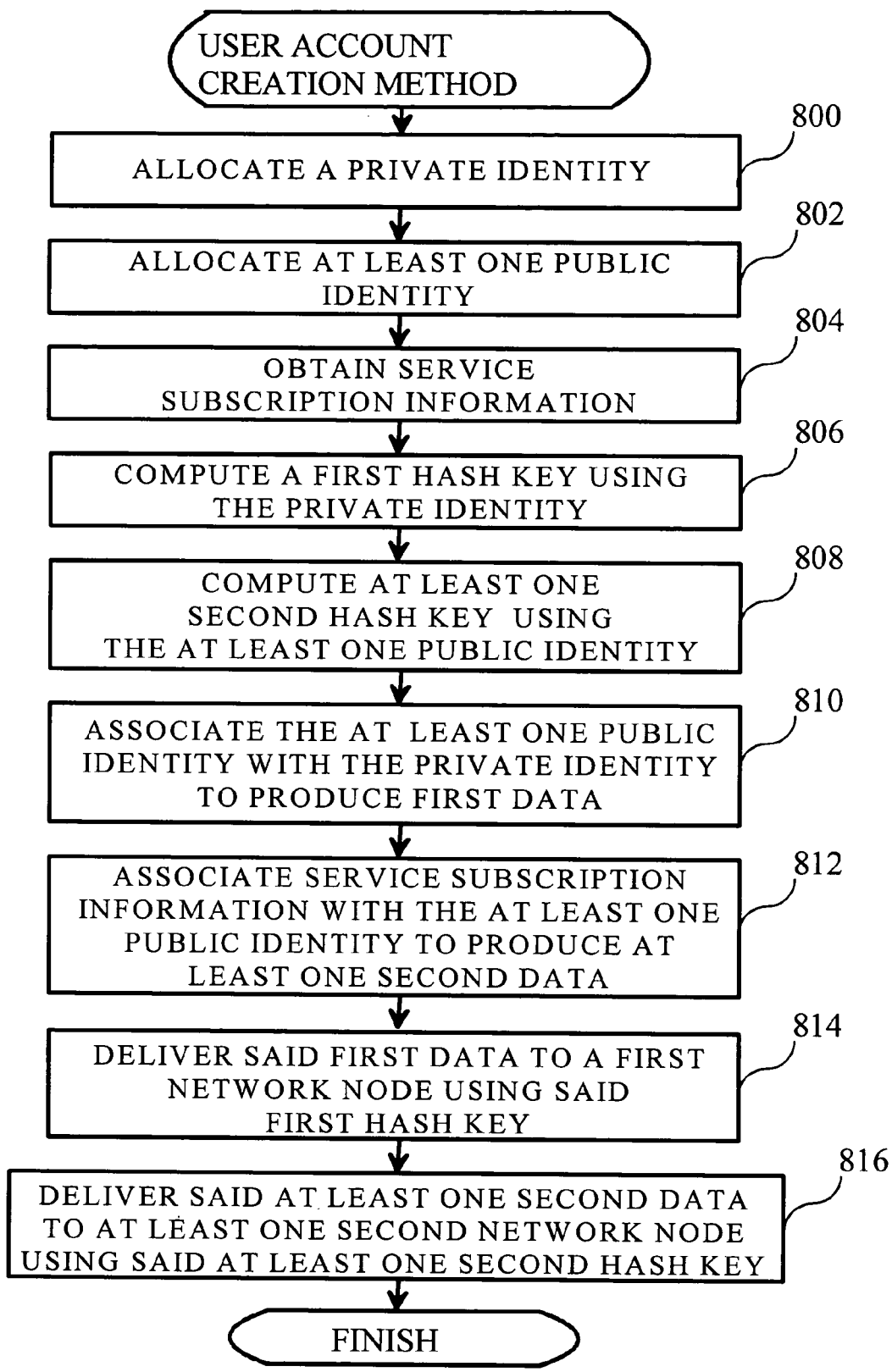
FIG. 8 is a flow chart illustrating a method for the creation of a user account in a distributed IP Multimedia Subsystem (IMS) in one embodiment of the invention.

FIG. 8 is a flow chart illustrating a method for the creation of a user account in a distributed IP Multimedia Subsystem (IMS) in one embodiment of the invention.

At step 800 a private user identity, for example, an IP Multimedia Private Identity (IMPI) is allocated for a new subscriber identity to be added to the distributed IP Multimedia Subsystem (IMS) comprising at least one IMS node. The allocation is informed to a network management node which manages the distributed IMS. The allocation may be performed in the network management node in one embodiment of the invention.

In one embodiment of the invention, the IMPI and its corresponding hash key are stored as part of the subscriber data in either a central management node or in the corresponding IMS node where the subscriber data is stored. Additionally, an IMPI and IMPI data structure is also created and added to the distributed IP Multimedia Subsystem (IMS) comprising at least one IMS node. This corresponds to IMPI 278 and IMPI data 279 in FIG. 4. The IMPI data may contain one or more pairs of IP Multimedia public user identities (IMPU) and corresponding hash keys, in addition to pointers to the subscriber identity and subscriber hash keys, authentication vectors used in the authentication process, and other relevant data.

At step 802 at least one public user identity, for example, an IMPU is allocated for the user.

In one embodiment of the invention, the value of each of the IMPUs and corresponding keys is stored in the IMPI data stored in a corresponding IMS node of the distributed IMS. Additionally, for each IMPU allocated to the user, an IMPU and IMPU data structure are also created and added to the distributed IP Multimedia Subsystem (IMS) comprising at least one IMS node. This corresponds to IMPU 270 and IMPU data 272 in FIG. 4.

At step 804 service subscription information is obtained for the user. For example, the service subscription information is obtained to the network management node from an administrative computer storing information entered at the operator's sales points. The service subscription information comprises information on allowed service levels, allowed quality of service and supplementary services required associated with various public identities or generally with the user.

At step 806 a first hash key is computed using the private identity in the network management node. In one embodiment of the invention, the first hash key is computed in a different node, which provides the hash key and the private identity to the network management node.

At step 808 at least one second hash key is computed using the at least one public identity in the network management node. In one embodiment of the invention, the second hash keys are computed in a different node, which provides the second hash keys and the associated public identities to the network management node.

At step 810 the at least one public identity is associated with a private identity to produce first data in network management node. The first data comprises a data entry or a file, for example, binary encoded data or an extensible markup language document.

At step 812 service subscription information is associated with the at least one public identity to produce at least one second data in network management node. The second data comprises at least one data entry or a file, for example, binary encoded data or an extensible markup language document.

At step 814 the first data is delivered to a first network node from the network management node using the first hash key. The delivery is performed using distributed hash table indexing and the traversing of network nodes until the first network node in charge of the key range of the first hash key is reached.

At step 816 the at least one second data is delivered to at least one second network node from the network management node using the at least one second hash key. The delivery is performed using distributed hash table indexing and the traversing of network nodes until a network node in charge of the key range of the hash key is reached. Thereupon, the method is finished and the subscription for the user is ready for allowing the user to register to the distributed IMS.

In one embodiment of the invention, also general subscriber data comprising, for example, billing information, full name, social security number or postal address is stored to a distributed IMS via operator subscriber management system. The general subscriber data comprises also a list of IMPI and respective hash key pairs associated with the subscriber identity. The general subscriber information is provided to the network management node. A third hash key is computed by the network management node or another node by hashing the subscriber identity, for example, a social security number or any unique identifier for the user. The general subscriber data is delivered to a third network node from the network management node using the third hash key. The delivery is performed using distributed hash table indexing and the traversing of network nodes until the third network node in charge of the key range of the third hash key is reached.

In one embodiment of the invention, a new subscriber identity is created together with the associated subscriber data. The subscriber identity and subscriber data is stored, according to one embodiment of this invention, in a centralized management node or a distributed system. The subscriber identity can be hashed to create a hash key which is used for storing the subscriber identity and subscriber data in an IMS node in charge of storing the range of corresponding hash values of the distributed hash table. The subscriber data contains user data information such as the billing information, addressing information. The subscriber data also contains one or more pairs of IP Multimedia private user identities (IMPI) and their corresponding hash keys. This corresponds to subscriber identity 480 and subscriber data 426 in FIG. 4.

Figure 7:
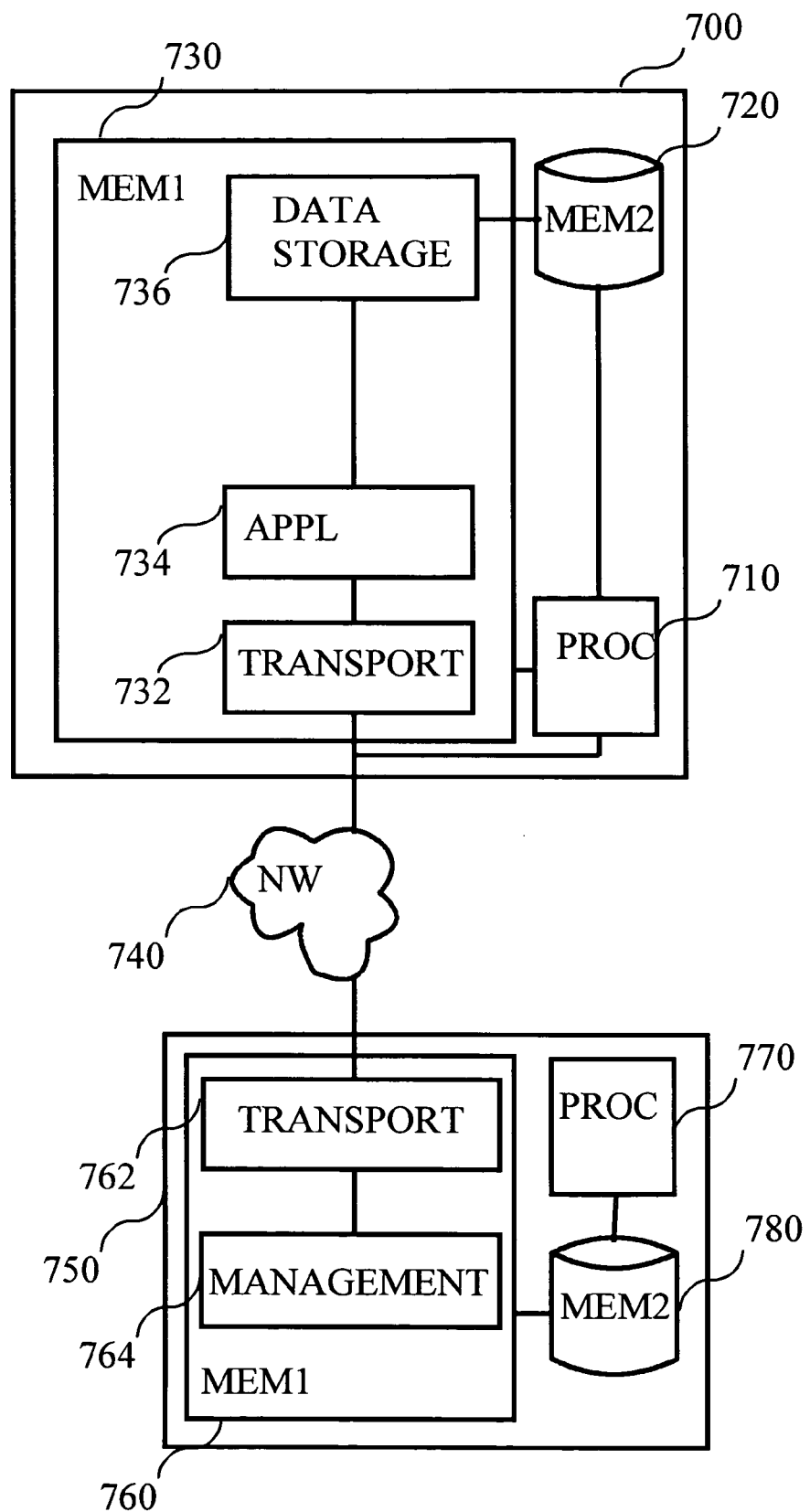
FIG. 7 is a block diagram illustrating an IP Multimedia Subsystem node and a network management node in one embodiment of the invention.

In one embodiment of the invention, the network management node is further disclosed in FIG. 7. In one embodiment of the invention the data produced during the method of FIG. 8 is illustrated more closely in FIG. 4.

FIG. 7 is a block diagram illustrating an IP Multimedia Subsystem node and a network management node in one embodiment of the invention.

In FIG. 7 there is an IMS node 700 and a network management node 750. IMS node 700 and network management node 750 communicate using a network 740, which may be, for example, an IP network. IMS node 700 comprises a processor 710 and a secondary memory 720. The secondary memory may be for example a hard disk or a flash memory, optic disk, holographic memory or other memory means known to persons skilled in the art. IMS node 700 comprises also a primary memory 730. When processor 710 is executing the IMS node functionality primary memory 730 comprises a transport/network protocol entity 732, an application entity 734 and a data storage entity 736. Transport entity comprises, for example, a TCP/IP, UDP/IP or SCTP/IP protocol stack. Application entity 734 comprises, for example, a SIP signaling function and associated with it a higher-level call control function. Data storage entity 736 performs, for example, all DHT related functions such as the obtaining of information associated with hash keys provided, the neighbor cache or an equivalent routing data structure for routing messages towards a key range responsible node based on hash keys. The DHT information may also be stored in secondary memory 720.

In one embodiment of the invention, application entity 734 may comprise data storage entity 736 so that they together form a single application entity.

Network management node 750 comprises a processor 770 and a secondary memory 780. The secondary memory may be for example a hard disk or a flash memory, optic disk, holographic memory or other memory means known to persons skilled in the art. Network management node 750 comprises also a primary memory 760. When processor 770 is executing the network management node functionality primary memory 760 comprises a transport/network protocol entity 762 and a management entity 764 which may communicate with the secondary memory. Transport entity 762 comprises, for example, a TCP/IP, UDP/IP or SCTP/IP protocol stack.

The entities within IMS node 700, such as transport/network entity 732, application entity 734 and data storage entity 736 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, holographic memory, magnetic or optic disk. Some entities may be implemented as program modules linked to another entity. The entities in FIG. 7 may also be stored in separate memories and executed by separate processors, which communicate, for example, via a message bus or an internal network within the network node. An example of such a message bus is the Peripheral Component Interconnect (PCI) bus. Processor 710 may have multiple cores and may represent several actual processors. The same concerns the entities within network management node 750 and its hardware.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
   receiving a signaling message at a first network node from a proxy network node, said signaling message providing a first private user identity and a first public user identity;
   computing a first key from said first private user identity;
   matching said first key to at least one key range, each said at least one key range being associated with a network node;
   determining a second network node by detecting that said first key belongs to the key range of said second network node;
   providing said signaling message to said second network node;
   obtaining data associated with said first private user identity in said second network node;
   extracting said first public user identity from said signaling message in said second network node;
   computing a second key from said first public user identity;
   routing said signaling message to a third network node identified with said second key;
   obtaining data associated with said first public user identity in said third network node;
   registering a registration status of said first public user identity as active in said third network node;
   registering an identity of said proxy network node in said data associated with said first public user identity;
   receiving a session establishment message at a fourth network node, said session establishment message comprising said first public user identity;
   determining a third key from said first public user identity in said fourth network node;
   routing said session establishment message to said third network node identified with said third key;
   receiving said session establishment message at said third network node;
   determining said registration status of said first public user identity; and
   in response to said determination, transmitting said session establishment message to said proxy network node.

2. The method according to claim 1, the method further comprising:
   determining at least one second public user identity associated with said first private user identity in said second network node;
   determining routing keys for each said at least one second public user identity; and
   routing the signaling message to at least one fifth network node identified with said routing keys.

3. The method according to claim 1, the method further comprising:
   determining a fifth network node having a key range closest to said first key; and
   sending said signaling message to said fifth network node.

4. The method according to claim 1, the method further comprising:
   receiving said signaling message at said proxy network node from an end device via an access network; and
   transmitting said signaling message to said first network node.

5. The method according to claim 1, wherein said signaling message is a Session Initiation Protocol message.

6. A system, comprising:
   a first network node configured
     to receive a signaling message from a proxy network node, said signaling message providing a first private user identity and a first public user identity,
     to compute a first key from said first private user identity,
     to match said first key to at least one key range, each said at least one key range being associated with a network node,
     to determine a second network node by detecting that said first key belongs to the key range of said second network node, and
     to provide said signaling message to said second network node;
   said second network node configured
     to obtain data associated with said first private user identity,
     to extract said first public user identity from said signaling message, to compute a second key from said first public user identity, and
     to route said signaling message to a third network node identified with said second key;
   said third network node configured
     to register a registration status of said first public user identity as active, obtaining data associated with said first public user identity,
     to register an identity of said proxy network node in said data associated with said first public user identity,
     to receive said session establishment message,
     to determine said registration status of said first public user identity, and in response to said determination, to transmit said session establishment message to said proxy network node,
   a fourth network node configured
     to receive a session establishment message, said session establishment message comprising said first public user identity,
     to determine a third key from said first public user identity, and
     to route said session establishment message to said third network node identified with said third key.

7. The system according to claim 6, the system further comprising:
said second network node configured to determine at least one second public user identity associated with said first private user identity, to determine routing keys for each said at least one second public user identity and to send said signaling message for routing in said system to at least one fifth network node identified with said routing keys; and
said at least one fifth network node.

8. The system according to claim 6, the system further comprising:
said second network node configured to determine a fifth network node having a key range closest to said first key and to send said signaling message to said fifth network node.

9. The system according to claim 6, the system further comprising:
an access network; and
said proxy network node configured to receive said signaling message from an end device via said access network and to transmit said signaling message to said first network node.

10. The system according to claim 6, wherein signaling message is a Session Initiation Protocol message.

11. An apparatus, comprising:
a processor configured
to receive a signaling message, said signaling message providing a first private user identity and a first public user identity,
to compute a first key from said first private user identity,
to match said first key to at least one key range, each said at least one key range being associated with a network node,
to determine a remote network node by detecting that said first key belongs to the key range of said remote network node,
to obtain data associated with said first private user identity,
to extract said first public user identity from said signaling message,
to compute a second key from said first public user identity,
to route said signaling message with said second key,
to register a registration status of said first public user identity as active,
to obtain data associated with said first public user identity,
to register an identity of a proxy network node in said data associated with said first public user identity,
to receive a session establishment message, said session establishment message comprising said first public user identity,
to determine a third key from said first public user identity,
to route said session establishment message with said third key,
determine said registration status of said first public user identity, and
in response to said determination, to transmit said session establishment message to said proxy network node.

12. An apparatus, comprising:
means for receiving a signaling message, said signaling message providing a first private user identity and a first public user identity;
means for computing a first key from said first private user identity;
means for matching said first key to at least one key range, each said at least one key range being associated with a network node;
means for determining a remote network node by detecting that said first key belongs to the key range of said remote network node;
means for obtaining data associated with said first private user identity;
means for extracting said first public user identity from said signaling message;
means for computing a second key from said first public user identity;
means for routing said signaling message with said second key;
means for registering a registration status of said first public user identity as active;
means for obtaining data associated with said first public user identity;
means for registering an identity of a proxy network node in said data associated with said first public user identity;
means for receiving a session establishment message, said session establishment message comprising said first public user identity;
means for determining a third key from said first public user identity;
means for routing said session establishment message with said third key;
means for determining said registration status of said first public user identity; and
means for, in response to said determination, transmitting said session establishment message to said proxy network node.

13. A computer program embodied on a computer readable medium, when executed on a data-processing system, the computer program being configured to perform:
receiving a signaling message, said signaling message providing a first private user identity and a first public user identity;
computing a first key from said first private user identity;
matching said first key to at least one key range, each said at least one key range being associated with a network node;
determining a remote network node by detecting that said first key belongs to the key range of said remote network node;
obtaining data associated with said first private user identity;
extracting said first public user identity from said signaling message;
computing a second key from said first public user identity;
routing said signaling message with said second key;
obtaining data associated with said first public user identity in said third network node;
registering a registration status of said first public user identity as active;
registering an identity of a proxy network node in said data associated with said first public user identity;
receiving a session establishment message, said session establishment message comprising said first public user identity;
determining a third key from said first public user identity;
routing said session establishment message with said third key;
determining said registration status of said first public user identity; and in response to said determination, transmitting said session establishment message to said proxy network node.

14. The computer program according to claim 13, wherein said computer readable medium is a removable memory card.

15. The computer program according to claim 13, wherein said computer readable medium is a removable memory device.

16. The computer program according to claim 13, wherein said computer readable medium is a magnetic disk, a holographic memory or an optical disk.

* * * * *